United States Patent
Garnett et al.

(10) Patent No.: US 6,856,513 B1
(45) Date of Patent: Feb. 15, 2005

(54) MEDIA DRIVE MOUNT

(75) Inventors: Paul Jeffrey Garnett, Camberley (GB); Helenaur Wilson, Camberley (GB); Murray Fordyce, Towcester (GB)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/403,669

(22) Filed: Mar. 31, 2003

(51) Int. Cl.[7] .............................................. H05K 7/16
(52) U.S. Cl. ...................... 361/725; 361/686; 361/685; 361/681; 312/223.1; 312/223.2; 312/223.3
(58) Field of Search ................................ 361/725, 680, 361/681, 685, 686, 684, 825, 826; 312/223.1, 223.2, 223.3

(56) References Cited

U.S. PATENT DOCUMENTS

| | | | |
|---|---|---|---|
| 5,236,259 A | | 8/1993 | Ryan et al. |
| 5,488,538 A | | 1/1996 | Wakita |
| 5,492,481 A | * | 2/1996 | Lewis .......................... 439/159 |
| 6,084,768 A | * | 7/2000 | Bolognia ..................... 361/685 |
| 6,292,359 B1 | | 9/2001 | Boe |

* cited by examiner

Primary Examiner—Kamand Cuneo
Assistant Examiner—Hung S. Bui
(74) Attorney, Agent, or Firm—Meyertons Hood Kivlin Kowert & Goetzel, P.C.; B. Noël Kivlin

(57) ABSTRACT

A media drive mount includes first and second first and second channels open at one end for receiving locating protrusions on a media drive. The locating protrusions can, for example, be screwed onto the media drive mount. Resilient detents are provided in the channels to co-operate with the resilient detents. The resilient detents can be configured to provide resistance during insertion and removal of the media drive, the former being used to provide positive locating of the media drive, and the latter to hold the media drive in the mount. Mounting and demounting of the media drive in the mount can be achieved without the use of tools.

39 Claims, 5 Drawing Sheets

MEDIA DRIVE MOUNT

BACKGROUND OF THE INVENTION

The invention relates to an apparatus and method for mounting a media drive.

It is known to provide mounts for media drives, such as floppy disk drives, CD-ROM drives, DVD drives, hard disc drives, etc., such that those media drives may be mounted within apparatus such as computer equipment. Many of such mounts employ means such as screw attachments for fixing the media drive within the mount. Although these mounts hold the media drive firmly in place, drives are not readily insertable and removable. Typically, therefore, tools are needed to remove any screws or other attaching means, and it is necessary to open the chassis of the computer equipment containing the mount, in order to gain access to those attaching means. Many mounts are bulky and cumbersome and add undesired weight to computer equipment. Furthermore, many mounts occupy a significant volume of space within the interior of, for example, the chassis of a computer.

There is, therefore, a need for a media drive mount that addresses at least some of the disadvantages discussed above.

SUMMARY OF THE INVENTION

An aspect of the invention provides a media drive mount for mounting a media drive. The media drive mount can include a first and second channel defining members for defining first and second channels. The channels can be open at one end for receiving locating protrusions of a media drive to be mounted in the media drive mount. At least one of the channels can include at least one resilient detent operable to co-operate with a received locating protrusion for resisting removal of a mounted media drive from the media drive mount.

In this manner, a media drive mount can be provided that enables the insertion and removal of a media drive without the use of tools for securing the media drive in an apparatus, for example electronic apparatus such as a computer system. The locating protrusions can also be configured to support the media drive in the media drive mount. Accordingly, the locating protrusions could also be defined as supporting protrusions.

It should be understood that where reference is made herein to media drives, this is intended to include both drives where the media is removable, such as floppy disks, CDs, DVDs, tapes etc, and drives where the media are not removable, such as hard disk drives, etc.

Each channel can include one or more resilient detents. The media drive can include one or more locating protrusions on each of one or more sides. A resilient detent can be provided for co-operating with some or all of the protrusions.

One or more of resilient detents can be configured to provide positive confirmation of correct mounting of the media drive to be mounted in the media drive mount. For example, a resilient detent can be operable to provide resistance to the insertion of a locating protrusion of the media drive to be mounted in the media drive, whereby overcoming of the resistance can indicate the correct mounting of the media drive in the media drive mount.

A resilient detent can be in the form of a protrusion that extends at least partially into one of the channels. The profile of a contact surface of the resilient detent within a channel can be configured to present greater resistance to removal than insertion of the media drive.

A resilient detent can, by way of example only:
have the form of a loop of material that protrudes into one of the channels, each of the ends of the loop being fixed to the channel defining member defining the channel;
have the form of a leaf spring;
be hinged to one the channel defining members;
be integrally formed with one of the channel defining members.

Each channel can have a T-shaped cross section with a narrower outer section and a wider inner section.

The first and second channel defining members can be spaced from, and extend substantially parallel to, each other, whereby a media drive to be mounted in the media drive mount can be received between the first and second channel defining members. An interconnection member can be provided to interconnect the first and second channel defining members at an end thereof opposite to the open ends of the channels. The interconnection member can be provided with an electrical connector operable to provide electrical connections to a mounted media drive. The interconnection member and the first and second channel defining members can be integral with each other.

A supporting arrangement (e.g. legs, possibly integral with the channel defining members) can be provided for supporting the channel defining members with respect to a support surface.

Another aspect of the invention provides an apparatus, for example a computer system unit, including a media drive mount as described above.

The apparatus can include a support surface with the media drive mount being supported on the support surface. The media drive mount can be operable to support the media drive spaced from the support surface. Where the support surface is a circuit board, electrical components can then be located on the circuit board between the circuit board and the media drive.

A further aspect of the invention provides a media drive provided with at least one locating protrusion to be received in each of the channels.

The locating protrusions can also be operable to support the media drive in the media drive mount. The media drive can be provided with two locating protrusions on a first surface thereof to be received in the first channel and two locating protrusion on a second, opposite, surface thereof to be received in the second channel. A locating protrusion can comprises a shaft having a first cross sectional area and a head having a larger cross-sectional area. The location protrusion can be provided with a screw or other fixing, for example for being received in a pre-formed hole in the media drive.

Another aspect of the invention provides a method of mounting a media drive within an apparatus, the method comprising: inserting at least first and second locating protrusions of a media drive into an open end of first and second channels in respective first and second channel defining members of a media drive mount; and sliding the locating protrusions along the channels past at least one resilient detent in at least one of the channels, the resilient detent co-operating with a received locating protrusion to subsequently resist removal of the mounted media drive from the media drive mount.

BRIEF DESCRIPTION OF THE DRAWINGS

Embodiments of the present invention will be described hereinafter, by way of example only, with reference to the accompanying drawings in which like reference signs relate to like elements and in which.

Figure 1:
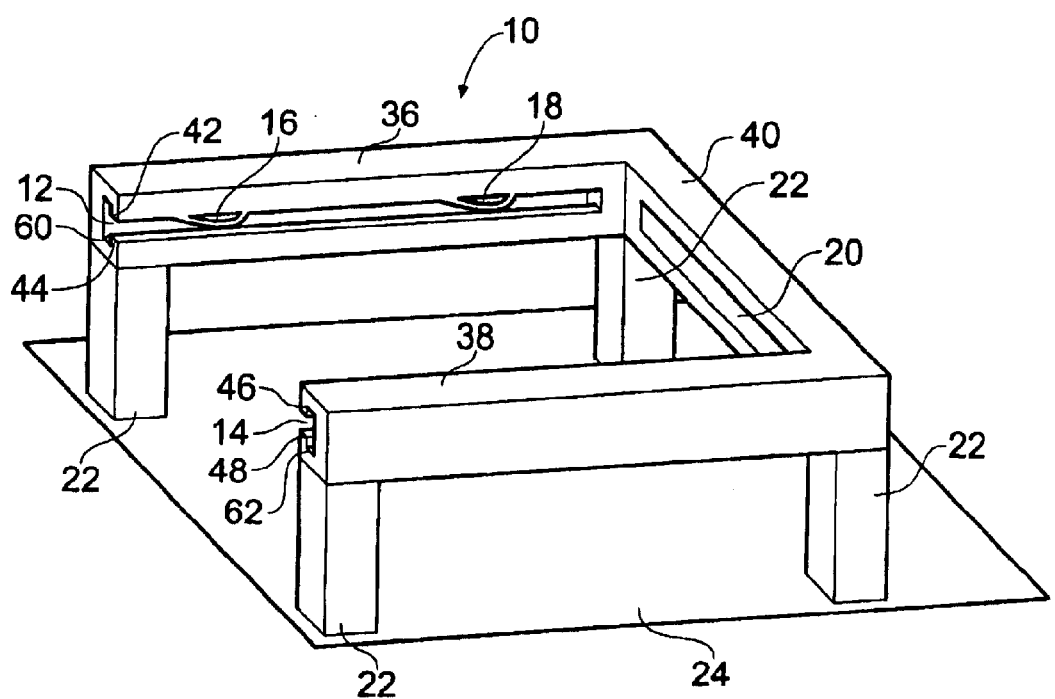
FIG. 1 is a schematic representation of a media drive mount according to an embodiment of the present invention.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments and examples are described hereafter by way of example only in the following with reference to the accompanying drawings.

FIG. 1 provides a schematic representation of a media drive mount 10 according to an embodiment of the present invention. The mount 10 is substantially C-shaped. The arms of the "C" form channel defining members 36 and 38 in which first 12 and second 14 channels, respectively, are defined. The cusp of the "C" is formed by an interconnection member 40 with a connector 20 for connection to corresponding connectors on a media drive 30 when mounted in the media drive mount 10.

In the example shown in FIG. 1, the channel defining members 36, 38 are integrally formed with the interconnection member 40. In alternative examples, however, the channel defining members 36, 38 and the interconnection member 40 may comprise separate sections that are joined to each other.

Also shown in FIG. 1 is a surface 24 upon which the media drive mount 10 may itself be mounted. The surface may comprise any suitable surface within an apparatus, for example a computer system. The surface may be part of a chassis of the equipment or a printed circuit board (PCB) such as a system motherboard.

Figure 3A:
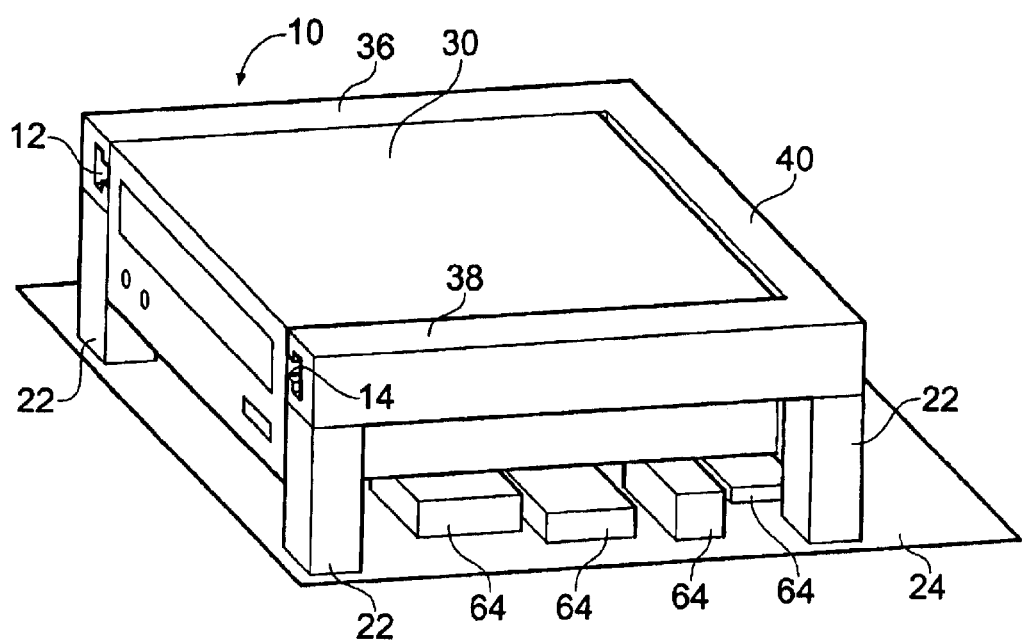
FIG. 3a is a schematic representation of the media drive of FIG. 2 in the mount of FIG. 1.

In the present embodiment, struts, or legs, 22 are provided for supporting the media drive mount on the surface 24. These legs 22 may be integrally formed with the media drive mount 10. Alternatively, they could be formed separately therefrom and be attached thereto using fastenings (e.g., screws), welding or gluing. The use of the legs 22 spacing the body of the media drive mount from the surface has the advantages of improving air circulation and freeing up the surface for the mounting of other components under a mounted media drive (this is illustrated in FIG. 3a).

The media drive mount 10 could be supported on the supporting surface 24 in other ways. For example although four legs are shown in FIG. 1, a different number of legs 22 and/or legs placed in alternative positions could be used according to design requirements. Alternatively, one or more plates attached to or integrally formed with the channel defining members and extending downwards to surface 24 could be used, whereby the plates may be fixed to that surface. To improve air circulation, the plate(s) may be formed in a mesh or a plurality of perforations or apertures through which air may flow.

Advantageously, the channels defining members 36 and 38, legs 22 and the interconnection member 40 (apart from the conductive components of the connector 20) are formed from insulating plastics material, for example Acrylonitrile-butadiene-styrene (ABS) plastics material. However, in some embodiments, other materials, for example a metal or metal alloy (e.g., aluminium) could be used, subject to providing suitable insulation for between conductive pathways for the connector 20 and, where appropriate suitable thermal integrity. For example, at least parts of the connector can be made, for example of a liquid crystal polymer, to resist the temperatures used in soldering contacts.

The connector 20 may be further connectable to components within the computer system 70 such as components 74 or the surface 24, by means of cabling such as a ribbon cable. This may be implemented by providing interconnection member 40 with further connectors which are appropriately connected to the connector 20. Alternatively (or additionally), electrical communication between the connector 20 and the surface 24 may be provided via channels housed within one or more of the legs 22.

In the example shown, the channels 12 and 14 are on the inner sides of the respective arms 36 and 38 of the C-shaped form such that the channels face each other. In this manner, the media drive can be received between the channel defining members 36 and 38. Also, the channels are open at the end (60, 62) of channel defining members 36 and 38 opposite to that at which the interconnection member is located. As is represented in FIG. 1, in the present example, each of the channels 12 and 14 is substantially T-shaped in cross section with a narrower outer section and a wider inner section such that each channel has an upper lip 42/46 and a lower lip 44/48. The purpose of this particular construction will be discussed shortly.

Located on the upper lip 42/46 of each of the channels 12/14 are two resilient detents (e.g., the resilient detents 16 and 18 illustrated in the channel 12 visible in FIG. 1). In this embodiment, each resilient detent 16 and 18 comprises a protruding loop of material, which protrudes downwards toward the lower lip 44 48 of that channel and is flush with the surface of that channel defining member 36/38 that faces the other channel defining member 36/38. Each of the resilient detents 16 and 18 is formed from a suitable material (such as plastics, metal or rubber) so that it can resiliently oppose compression towards the upper lip 42/46 of the channel in which it is located. Advantageously, the resilient detents are integrally formed with the channel defining members 36/38. For example, such a construction can be achieved particularly advantageously by forming the channel defining members and the resilient detents from a suitable plastics material (e.g. ABS plastics material). Alternatively, the resilient detents may be attached to the upper lip 42/46 of the channel defining members 36/38, whereby a different material for those two components may be used. Alternative embodiments of the resilient detents 16/18 may be envisaged.

Figure 2:
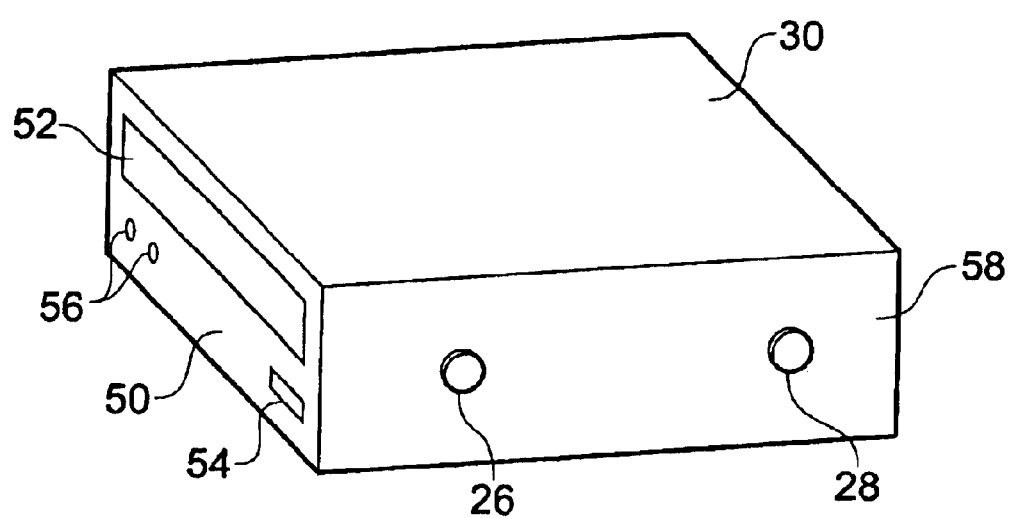
FIG. 2 is a schematic representation of a media drive for use with the mount of FIG. 1.

FIG. 2 shows a media drive 30 suitable for mounting in the media drive mount of the present embodiment of the invention. As mentioned earlier, the media drive could be a drive for fixed and/or removable media. Thus, for example, the media drive may comprise a drive for removable media such as a floppy disk, a CD-ROM, a DVD, a tape etc. The media drive may also be drive for non-removable media, for example a disc drive, any other form of fixed or hard disk drive, a fixed tape drive, and so on. On the front bezel 50 of the media drive 30 is situated an aperture 52, for insertion of the appropriate media. Assorted controls 54 and/or indicator lights 56 may also be present.

On each of the side panels 58 of the media drive are situated two locating protrusions, or locators, 26 and 28. These locators 26 and 28 are positioned such that when the media drive 10 is inserted into the media drive mount 10, the locators 26 and 28 on each side panel 58 align with, and slide sequentially into the respective channels 12 and 14. In the example shown, locator 28 enters first and is followed by locator 26. Although in the present embodiment, two locators 26 and 28 are mounted on each side panel 58, a single locator or more than two locators per side panel 58 may be employed. One side panel 58 may employ a different number of locators to the other side panel 58. The locators 26 and 28 may be integrally formed with the side panels 58 or may be attached using a fastening, for instance, a screw attachment. The locators can be made of any suitably robust material, for example of metal of a hard plastics material.

Figure 4:
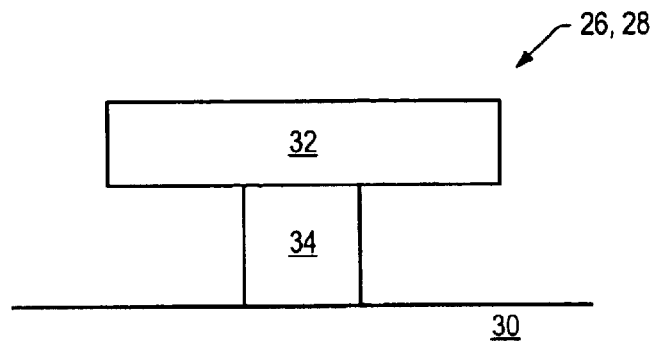
FIG. 4 is a schematic representation of a location protrusion on the media drive of FIG. 2.

FIG. 4 shows a side view of an example of a locator 26/28. Each locator comprises an axle, or shaft, 34 and a flanged section 32. The view of the locator 26/28 shown in FIG. 4 shows that the side profile of each locator is substantially T-shaped. Thus, when the locator 26/28 is inserted into a channel 12/14, the flanged section 32 enters the wider portion of that channel 12/14, while the shaft 34 enters between the upper lip 42/46 and the lower lip 44/48.

In the example shown in FIG. 2, the flanged section 32 (and indeed the shaft 34) of each locator 26/28 is circular in cross section. In this example, the flanged section 32 and the shaft 34 are formed integrally with each other and also with a screw thread formed at the end of the shaft opposite to that at which the flanged section is located. With this construction the locator can be manufactured at low cost and can readily be attached to a media drive in one of the preformed, female threaded holes typically provided in the side panels 58 of commercially available media drives. Such a construction is also robust, whereby the locators can also be used to support the media drive 30 in the media drive mount 10. As such the locators could also be described as support elements, or support protrusions. By forming the locators 26/28 with a smooth surface, the locators can be readily be slid along the channels 12/14 during insertion or removal of the media drive 30.

In order further to aid the progress of the locators 26/28 along the channel 12/14 during insertion or removal of the media drive 30, the flanged section 34 could be configured to rotate axially around the shaft 34. In such an embodiment, the flanged section 34 would be operable to roll along the lower surface 60/62 of the channel 12/14 whereby resistance to the motion of the locator within the channel would be reduced. Alternatively, both the flanged section 32 and the shaft 34 may be operable to rotate (either in a fixed manner with respect to one another or independently). In such embodiments, the shaft 34 would roll along the lower lip 44/48 of the channel, further reducing resistance to the motion of the locator 26/28.

Figure 3B:
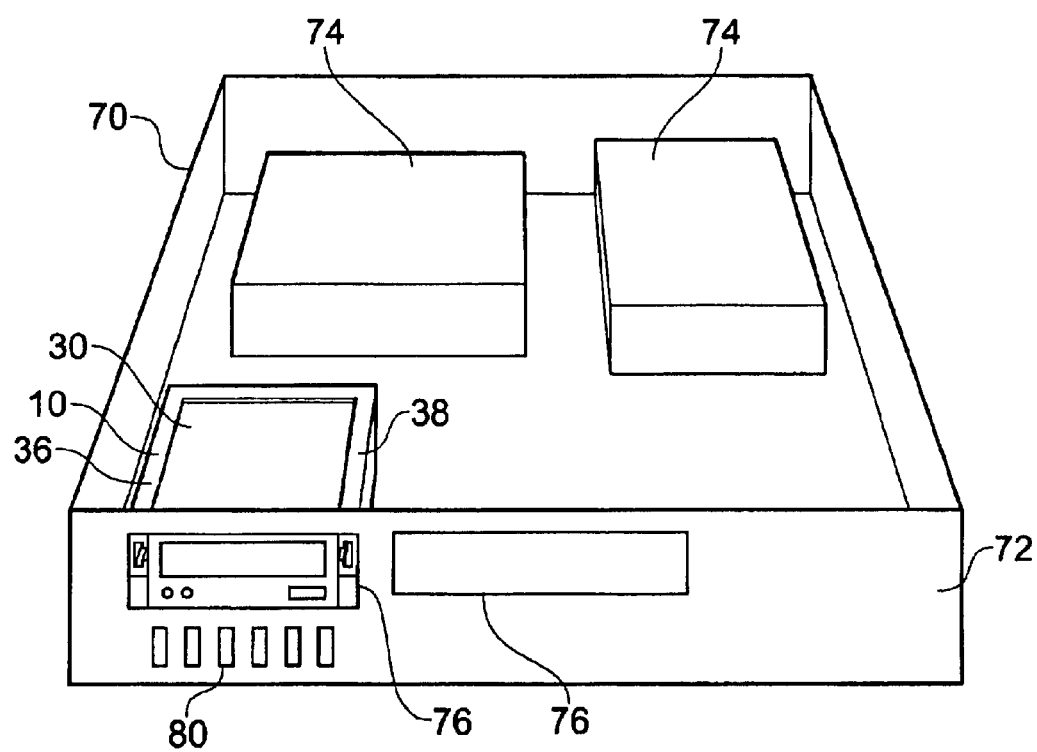
FIG. 3b is a schematic representation of a computer system comprising the mount of FIG. 1, in which the media drive of FIG. 2 is mounted.

In FIG. 3a, there is shown a view of the media drive 30 mounted in a media drive mount 10. In FIG. 3b, shows a schematic representation of a computer system 70, comprising a mount 10 according to an embodiment of the present invention. The computer system 70 comprises a chassis 72 which contains components 74 and which further provides a housing for media drive 30 and mount 10. Apertures 76 are formed in the chassis 72 of the computer system 70 which allow the media to be inserted into the media drive 30 as well as to allow easy installation and/or removal of the media drive 30 within mount 10. The chassis 72 also comprises perforations 80 situated below aperture 76 to allow air to flow in and/or out of the chassis 72.

Returning now to the embodiment shown in FIG. 3a, the media drive 30 is mounted such that there is a gap between the media drive 30 and the surface 24. This gap may be used to accommodate further components 64 such as electrical components. In alternative embodiments, the height at which the media drive 30 is mounted with respect to the surface 24 (and therefore the gap between them) may be varied in a number of ways. Firstly, the lengths of the legs may be varied, or indeed variable. Secondly, the position of the locators 26/28 on the media drive 30 may be altered. In such embodiments, the upper surface of the media drive 30 need not be flush with the upper surface of the channel defining members 36/38 or connector assembly 40. In some embodiments, the channel defining members 36/38 may be slidably mounted on the legs 22, whereby the gap may also be varied.

FIG. 3a also demonstrates two further advantages afforded by the invention. Firstly, since the legs 22 separate the channel defining members 36/38 from the surface 24, the volume between the channel defining members 36/38 and the surface 24 is available for occupation by further components 64. Secondly, this open volume facilitates the circulation of air around and beneath the media drive 30 thus allowing the media drive 30 and any components mounted 64 on the surface 24 to be effectively cooled. Such cooling is further facilitated by the apertures 80 which are positioned in close proximity to the open volume.

In FIG. 3a, it is shown that the side panels 58 of the media drive 30 abut the channel defining members 36/38. For the provision of further air circulation around the media drive 30, the lengths of the shafts 34 (and of course the length of the connector assembly 40) may be varied in order that a gap exists between the side panels 30 and the channel defining members 36/38. Similar considerations apply to the rear panel of the media drive 30 and the connector assembly 40.

Figure 5:
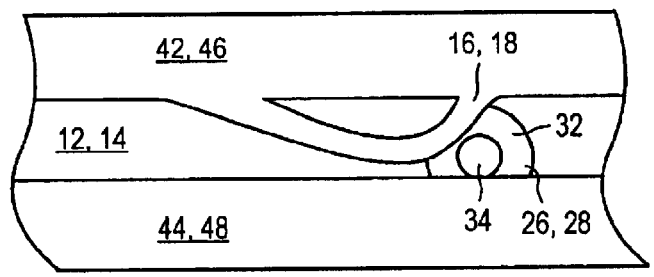
FIG. 5 is a schematic representation of a side view of a resilient detent with a locating protrusion in the mounted position of the media drive in the media drive mount.

Referring now to FIG. 5, there is shown a side view of a resilient detent, or biasing element 16/18 with a locator 26/28 situated in close proximity thereto. As discussed above, when the media drive 30 is inserted into the media drive mount 10, the locators 26/28 enter and move along the channels 12/14. In the present embodiment, when a locator 26/28 encounters a resilient detent 16/18, the resilient detent 16/18 is compressed upwards, towards the upper lip 42/46. The resilient detent 16/18 is configured to act as a spring and accordingly, it resiliently opposes the passage of the locator 26/28 along the channel 12/14. When sufficient force is applied to the media drive 30 as it is inserted into the media drive mount 10, the locator 26/28 eventually overcomes the opposing force and slides under and subsequently past the resilient detent 16/18 whereby the user can perceive a change in the resistance to insertion.

This change of resistance to insertion provides a tactile indication that the media drive 30 is correctly mounted in the media drive mount 10. The resilient detent 16/18 then returns to a relaxed position. If this return occurs in a "snap" manner, then an audible indication of the correct mounting of the media drive 30 in the media drive mount 10 can also be provided.

In the present embodiment, two resilient detents 16/18 are provided for each of the two channels 12/14, and each side panel 58 of the media drive 30 is provided with two locators 26/28. Upon insertion of the media drive 30 into the media drive mount 10, the first locators 28 on each side panel encounter and pass the first resilient detent 16 of the corresponding channel 12/14 in the manner described above. The locators 26/28 of each side panel 58 and the resilient detents 16/18 of the corresponding channels 12/14 are spaced such that when the first locator 28 of each side panel 58 encounters the second resilient detent 18 of the respective channel 12/14, the second locator 26 encounters the first resilient detent 16 of that channel 12/14. Furthermore, the locators 26/28 and the resilient detents 16/18 are positioned such that as the shafts 34 pass under the resilient detents 16/18, the connectors at the rear of the media drive 30 simultaneously connect with the connector 20. In this example, it is only the tactile and potentially audible feedback that indicates the correct locating of the media drive 30 in the media drive mount 10.

Figure 6:
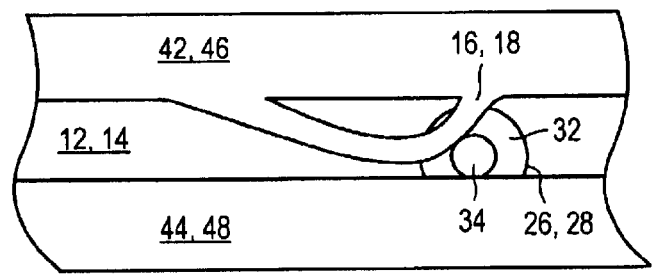
FIG. 6 is a further schematic representation of a side view of a resilient detent with a locating protrusion in the mounted position of the media drive in the media drive mount.

Once the media drive 30 has been fully inserted into the media drive mount 10, the positions of the locators 26/28 with respect to their corresponding resilient detents 16/18 may be that shown in FIG. 5. Alternatively, as shown in FIG. 6, the shaft 34 of each locator 26/28 may abut the corresponding resilient detent 16/18 such that the resilient detent is slightly compressed towards the upper lip 42/46. In this case, each resilient detent 16/18 serves to hold the media drive 30 in place and acts to urge the media drive 30 towards the connector assembly 40. The connectors at the rear of the media drive 30 are thereby held firmly in contact with the connector 20 of the connector assembly 40.

Although, in the present embodiment, resilient detent 16/18 is located on upper lip 42/46, it is envisaged that it may be located on lower lip 44/48. It is further envisaged that resilient detents may be located on both the upper 42/46 and lower 44/48 lip. Advantageously, a resilient detent 16/18 may be provided on lower lip 44/48 to coincide with a resilient detent 16/18 provided on upper lip 42/46 such that locators 26/28 must pass between two resilient detents simultaneously. This arrangement would provide additional resistance to the removal of the drive, thereby providing a more secure mount. Further, if resilient detents 16/18 are provided on both the upper 42/46 and lower 44/48 lip in this way, the resilient strength required of the detents 16/18 is lessened.

In the embodiments shown in FIGS. 1, 5 and 6, the loops forming the resilient detents are asymmetric. This arrangement eases the insertion of the media drive 30 into the media drive mount 10, while presenting greater resistance to the removal of the drive 30. While this type of resilient detent provides the advantage of differential resistance to insertion and removal, in some embodiments, a symmetrical loop could be provided instead for one or more of the resilient detents.

When it is required that the media drive 30 be removed from the media drive mount 10, it is necessary only to withdraw the media drive 30 with enough force to overcome the resistance presented by the resilient detents 16/18. The media drive 30, or a different media drive, may then be inserted as described above. To aid with the media drives 30 withdrawal, means such as a handle located on the upper surface or front bezel 50 of the media drive 30 may be provided.

It will be appreciated that further alternative embodiments can be envisaged.

For example, rather than a resilient detent per locator, less resilient detents that locators may be provided. For instance, only one resilient detent may be provided in one specific example, and only one resilient detent per channel in another specific example.

Also, by way of further example, each resilient detent 16/18 may comprise two loops situated side by side in the respective channel 12/14 and extending into that channel 12/14. In the mounted position, therefore the shaft 34 of each locator 26/28 would sit between each loop. Motion of the locators 26/28 along the channels 12/14 would thereby be resisted and the media drive 30 would be held in place.

Figure 7:
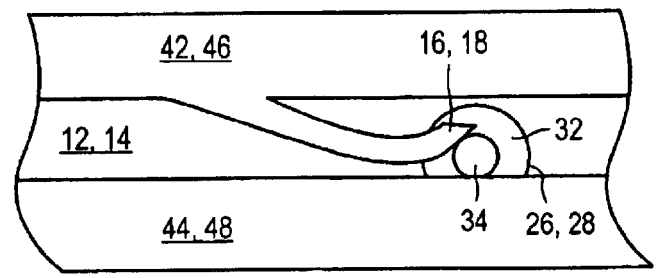
FIG. 7 shows an embodiment of a hinged resilient detent.

By way of yet another example, the resilient detent 16/18 may be configured as a leaf spring and/or as a wedge hinged to channel wall for resiliently opposing the passage of the locators down the channels. An example of this is shown in FIG. 7.

In other embodiments, the cross sectional shape of the channels 12/14 may be different. The cross section shape of the locators 26/28 may be varied accordingly. For example, the flange shaped head may be omitted. Also, for example, rather than the locators being circular when viewed in cross section perpendicular to the axis of the shaft, then may have an elongate ellipsoidal or rectangular shape.

In one embodiment for example, each channel 12/14 may comprise only a upper lip 42/46 with resilient detents 16/18 while the lower lip 44/48 of the preferred embodiment has been omitted. This particular variation on the channel cross section may, for example, provide additional space further types of resilient detents 16/18 within the channels.

In other embodiments, instead of allowing lower surface 60/62 to bear the weight of the media drive 30, channel defining members 36/38 and/or interconnection member 40 upon may be provided with a lip upon which the lower surface of the media drive 30 may sit. In such embodiments, it would be possible to omit the lower lip and lower surface of the channel defining members.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A media drive mount comprising first and second channel defining members defining first and second channels that are open at one end for receiving locating protrusions of a media drive to be mounted in the media drive mount, at least one of the channels having a resilient detent configured:

to co-operate with a received locating protrusion to provide resistance to the insertion of the media drive into the media drive mount;

to provide resistance to the removal of the mounted media drive from the media drive mount; and to provide a greater resistance to the removal of the media drive than to the insertion of the media drive.

2. The media drive mount of claim 1, wherein each channel is configured to receive at least one locating protrusion of the media drive to be mounted in the media drive mount, a resilient detent being provided in each channel to co-operate with a received locating protrusion.

3. The media drive mount of claim 1, wherein each channel is configured to receive a plurality of locating protrusions of the media drive to be mounted in the media drive mount, a respective resilient detent being provided to co-operate with each received locating protrusion.

4. The media drive mount of claim 1, wherein at least one resilient detent is configured to provide positive confirmation of correct mounting of the media drive to be mounted in the media drive mount.

5. The media drive mount of claim 4, wherein the at least one resilient detent is operable to provide resistance to the insertion of a locating protrusion of the media drive to be mounted in the media drive mount, whereby overcoming of the resistance being indicative of the correct mounting of the media drive in the media drive mount.

6. The media drive mount of claim 1, wherein the at least one resilient detent comprises a protrusion that extends at least partially into one of the channels.

7. The media drive mount of claim 6, wherein the profile of a contact surface of the at least one resilient detent within the channel is configured to present greater resistance to removal than insertion of the media drive.

8. The media drive mount of claim 1, wherein the at least one resilient detent comprises a loop of material that protrudes into one of the channels, each of the ends of the loop being fixed to the channel defining member defining the channel.

9. The media drive mount of claim 1, wherein the at least one resilient detent comprises a leaf spring.

10. The media drive mount of claim 1, wherein the at least one resilient detent is hinged to one of the channel defining members.

11. The media drive mount of claim 1, wherein the at least one resilient detent is integrally formed with one of the channel defining members.

12. The media drive mount of claim 1, wherein each channel has a T-shaped cross section with a narrower outer section and a wider inner section.

13. The media drive mount of claim 1, wherein the at least one locating protrusion supports the media drive within the media drive mount.

14. The media drive mount of claim 1, further comprising an electrical connector operable to provide electrical connections to the mounted media drive.

15. The media drive mount of claim 1, wherein the first and second channel defining members are spaced from, and extend substantially parallel to, each other, the media drive to be mounted in the media drive mount being received between the first and second channel defining members.

16. The media drive mount of claim 15, further comprising an interconnection member that interconnects the first and second channel defining members at an end thereof opposite to the open ends of the channels.

17. The media drive mount of claim 16, wherein the interconnection member is provided with an electrical connector operable to provide electrical connections to the mounted media drive.

18. The media drive mount of claim 16, wherein the interconnection member and the first and second channel defining members are integrally formed.

19. The media drive mount of claim 1, further comprising at least one support for supporting the channel defining members with respect to a support surface.

20. The media drive mount of claim 19, wherein the supports comprise legs.

21. The media drive mount of claim 20, wherein the legs are integrally formed with the channel defining members.

22. An apparatus comprising a media drive mount, the media drive mount comprising first and second channel defining members defining first and second channels that are open at one end for receiving locating protrusions of a media drive to be mounted in the media drive mount, at least one of the channels having a resilient detent configured:
  to co-operate with a received locating protrusion to provide resistance to the insertion of the media drive into the media drive mount;
  to provide resistance to the removal of the mounted media drive from the media drive mount; and
  to provide a greater resistance to the removal of the media drive than to the insertion of the media drive.

23. The apparatus of claim 22, comprising a support surface, the media drive mount being mounted on the support surface.

24. The apparatus of claim 23, further comprising the media drive, wherein the media drive mount is operable to support the media drive at a position spaced from the support surface.

25. The apparatus of claim 24, wherein the support surface is a circuit board.

26. The apparatus of claim 25, wherein electrical components are located on the circuit board between the circuit board and the media drive.

27. The apparatus of claim 22, further comprising the media drive, the media drive being provided with at least one locating protrusion received in each of the channels.

28. The apparatus of claim 27, wherein the media drive is provided with two locating protrusions on a first surface thereof, each locating protrusion being received in the first channel and two locating protrusions on a second, opposite, surface thereof, each locating protrusion being received in the second channel.

29. The apparatus of claim 27, wherein the at least one locating protrusion is operable to support the media drive in the media drive mount.

30. The apparatus of claim 27, wherein the at least one locating protrusion comprises a shaft having a first cross sectional area and a head having a larger cross-sectional area.

31. A method of mounting a media drive within computer equipment, comprising:
  inserting at least first and second locating protrusions of the media drive into an open end of first and second channels in respective first and second channel defining members of a media drive mount; and
  sliding the locating protrusions along the channels past at least one resilient detent in at least one of the channels, whereby the resilient detent co-operates with a received locating protrusion to provide resistance to insertion of the media drive and subsequently to provide a greater resistance to removal of the mounted media drive from the media drive mount.

32. A media drive comprising at least one locating protrusion on a first surface thereof to be received in a first channel of a media drive mount and at least one locating protrusion on a second, opposite, surface thereof to be received in a second channel of the media drive mount, wherein the at least one locating protrusion comprises a shaft having a first cross sectional area and a head having a larger cross-sectional area.

33. The media drive of claim 32, wherein the locating protrusion is operable to support the media drive in the media drive mount.

34. A media drive mount comprising first and second channel means for receiving locating protrusions of a media drive to be mounted in the media drive mount, the channel means having resilient detent means for co-operating with a received locating protrusion to provide resistance to insertion of the media drive into the media drive mount and to provide resistance to removal of the mounted media drive from the media drive mount, wherein the resistance provided to said removal is greater than the resistance to said insertion of said media drive.

35. A media drive mount comprising first and second channel defining members defining first and second channels that are open at one end for receiving locating protrusions of a media drive to be mounted in the media drive mount, at least one of the channels including a resilient detent configured to co-operate with a received locating protrusion to provide resistance to removal of the mounted media drive from the media drive mount, wherein each channel has a substantially T-shaped cross section with a narrower outer section and a wider inner section.

36. An apparatus comprising a media drive mount and a media drive, the media drive mount comprising first and second channel defining members defining first and second channels that are open at one end for receiving locating protrusions of the media drive to be mounted in the media drive mount, at least one of the channels including at least one resilient detent operable to co-operate with a received locating protrusion for resisting removal of the mounted media drive from the media drive mount, the apparatus also comprising a support surface, wherein the media drive mount is mounted on the support surface and wherein the media drive mount is operable to support the media drive at a position spaced from the support surface.

37. The apparatus of claim 36, wherein the support surface is a circuit board.

38. The apparatus of claim 37, wherein electrical components are located on the circuit board between the circuit board and the media drive.

39. An apparatus comprising a media drive mount and a media drive, the media drive comprising at least one locating protrusion, said locating protrusion comprising a shaft having a first cross sectional area and a head having a larger cross-sectional area, the media drive mount comprising first and second channel defining members defining first and second channels that are open at one end for receiving a locating protrusion of the media drive, at least one of the channels including at least one resilient detent configured to co-operate with a received locating protrusion for resisting removal of a mounted media drive from the media drive mount.

* * * * *